(No Model.)
G. H. CARVER.
SPROCKET CHAIN TIGHTENER.
No. 572,864. Patented Dec. 8, 1896.
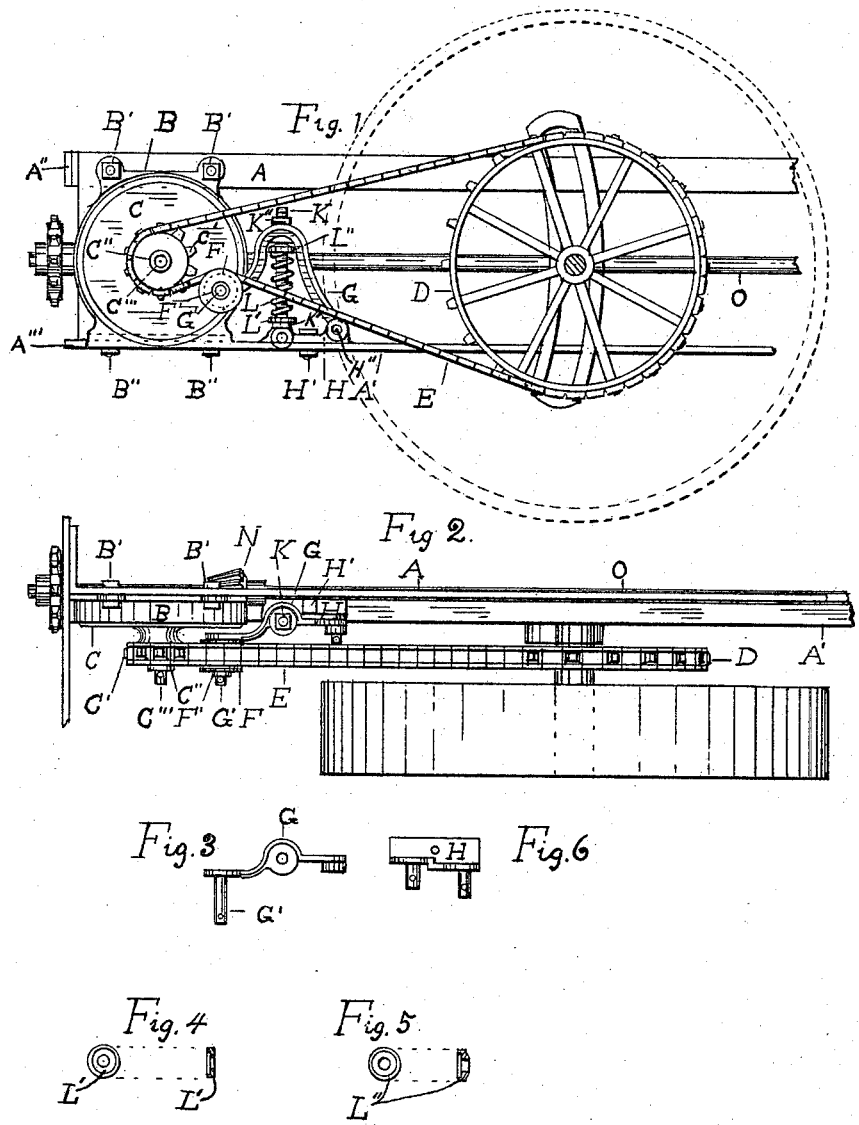
WITNESSES,
D. H. Sterling.
Susie M. Hunt.
INVENTOR,
George H. Carver.
By G. G. Hunt
atty.

UNITED STATES PATENT OFFICE.

GEORGE H. CARVER, OF PLANO, ILLINOIS, ASSIGNOR TO THE PLANO MANUFACTURING COMPANY, OF CHICAGO, ILLINOIS.

SPROCKET-CHAIN TIGHTENER.

SPECIFICATION forming part of Letters Patent No. 572,864, dated December 8, 1896.

Application filed February 1, 1893. Serial No. 460,514. (No model.)

*To all whom it may concern:*

Be it known that I, GEORGE H. CARVER, a citizen of the United States, residing at Plano, in the county of Kendall and State of Illinois, have invented a new and useful Improvement in Tightening Sprocket-Chains of Harvesters, of which the following is a specification.

My improvement relates to apparatus for transmitting motion from one part of the driving mechanism to another in harvesters by means of endless chains; and the object of my improvement is to provide a cheap, durable, and yielding device for taking up the slack in the said endless chains. I attain this object by the mechanism illustrated in the accompanying drawings, in which—

Figure 1 is a side view of the inside part of the gear-frame of a harvester with gearing attached, looking from the stubble side of the machine, the axle being in section just inside the sprocket-wheel. Fig. 2 is a plan of the same parts. Fig. 3 is a detached side view of a spring-bracket G, attached to the frame when in use. Fig. 4 is a top view, with adjacent sectional view, of a recessed collar for supporting the spring in said bracket G. Fig. 5 is a bottom view, with adjacent sectional view, of a similar collar capping said spring. Fig. 6 is a top view of the bracket H detached.

Similar letters refer to similar parts throughout the several views.

A is the top and A' the bottom longitudinal member of the inside part of a gear-frame of a harvester. A'' is the top and A''' the bottom member of the rear portion of the same frame.

B is a bracket on which is mounted a bevel-gear C. This bracket is attached to the frame by bolts B' B''. The bevel-gear has fixed to or formed integral with it a sprocket-wheel C', the two rotating upon a stud C''', attached rigidly to the bracket B. The sprocket and bevel-gear are preferably in one piece and held in position by a washer C'' and a pin passing through the stud. An endless chain E transmits motion from a sprocket D on a driving-wheel to the sprocket C'.

F is a sheave upon which the slack side of the chain E rests. The sheave F is mounted on a stud G', integral with a lever G, which is mounted on a pivot H'', integral with a bracket H, which is attached to the member A' by a bolt and nut H'. An eyebolt K is pivoted on the bracket H and fastened thereon by a pin passing through the pivot. The eyebolt is threaded the entire length for the reception of a tension-adjusting nut K' and a limiting-nut K''. The nut K' is placed at the lower end of the bolt near the eye and the nut K'' at the top of the bolt above the lever G. The upper part of said eyebolt passes quite loosely through the lever G, so as to allow the lever to move on its pivot. A coiled spring L encircles the eyebolt with its lower end resting in the recess in the collar L'. A similar collar L'', but having a conical top, rests upon the top of the spring, the conical part pressing upward against the lever. By turning the nut K'' upward the movement of the lever is increased, and vice versa, thereby limiting the pressure of the sheave to a fixed point. By screwing the nut K' upward a greater tension of the spring is obtained and thereby a greater pressure by the sheave on the chain. The sheave is held in proper position on the stud G' by a washer F' and pin passing through the stud.

N is a bevel-pinion mounted on a power-shaft O and turning therewith. A spline on the shaft fitting in a slot in the pinion allows the pinion to be moved on the shaft to throw it out of or in gear with the bevel-gear C.

Having thus described my invention, what I claim as new, and desire to secure by Letters Patent, is—

In a harvester, the chain driving-gears, D and C', in combination with a driving-chain, E, applied thereto, the arm or lever, G, pivoted at one end to the frame and extending up at the side of and above the lower section of the chain and then bending downward to a point below said chain-section, a roller mounted on a pin at the free end of said bent lever and projecting underneath the chain, a pin or bolt, K, pivoted to the frame at one end just below the upward curve of the lever and extending up through the latter at the curve thereof, a spring, L, applied to the pin and arranged to force the lever upward on the said bolt, and an adjusting device on the bolt adapted to regulate the movement of the lever thereon, substantially as described.

GEORGE H. CARVER.

Witnesses:
B. R. BLAISDELL,
GEORGE G. HURD.